US010260900B2

(12) United States Patent
Becker et al.

(10) Patent No.: US 10,260,900 B2
(45) Date of Patent: Apr. 16, 2019

(54) METHOD, APPARATUS AND COMPUTER PROGRAM PRODUCT FOR ROUTE GENERATION

(71) Applicant: HERE Global B.V., Eindhoven (NL)

(72) Inventors: Wolfgang Becker, Veldhoven (NL); Markus Kopp, Veldhoven (NL)

(73) Assignee: HERE Global B.V., Eindhoven (NL)

( * ) Notice: Subject to any disclaimer, the term of this patent is extended or adjusted under 35 U.S.C. 154(b) by 262 days.

(21) Appl. No.: 14/528,198

(22) Filed: Oct. 30, 2014

(65) Prior Publication Data

US 2016/0123756 A1    May 5, 2016

(51) Int. Cl.
G01C 21/34 (2006.01)
H04W 4/02 (2018.01)
G01C 21/30 (2006.01)

(52) U.S. Cl.
CPC ......... G01C 21/3476 (2013.01); G01C 21/30 (2013.01); G01C 21/3446 (2013.01); G01C 21/3453 (2013.01); H04W 4/023 (2013.01)

(58) Field of Classification Search
None
See application file for complete search history.

(56) References Cited

U.S. PATENT DOCUMENTS

| 5,933,100 A * | 8/1999 | Golding | G01C 21/3492 340/988 |
| 8,824,337 B1 * | 9/2014 | Geisberger | G01C 21/3446 370/238 |
| 9,056,616 B1 * | 6/2015 | Fields | B60W 50/14 |
| 2006/0217879 A1 | 9/2006 | Ikeuchi et al. | |
| 2010/0057352 A1 | 5/2010 | Nakae et al. | |
| 2012/0116678 A1 * | 5/2012 | Witmer | G01C 21/32 702/5 |
| 2014/0343841 A1 * | 11/2014 | Faaborg | G01C 21/3438 701/465 |
| 2015/0308841 A1 | 10/2015 | Matsunaga et al. | |

FOREIGN PATENT DOCUMENTS

WO    WO-2014/103142    7/2014

OTHER PUBLICATIONS

Extended European Search Report for European Patent Application No. 15190682.3 dated Oct. 26, 2016, 12 pages.
Office Action for European Application No. 15 190 682.3 dated Jan. 30, 2019, 7 pages.

* cited by examiner

Primary Examiner — Hussein Elchanti
Assistant Examiner — Paul A Castro
(74) Attorney, Agent, or Firm — Alston & Bird LLP

(57) ABSTRACT

Provided herein is a method, apparatus and computer program product for the generation of a route. In particular, the method may include receiving a plurality of trace points, where each of the plurality of trace points includes location information, receiving a distance tolerance value for each trace point, generating a first portion of a route using a first subset of the plurality of trace points, generating a second portion of the route using a second subset of the plurality of trace points, and concatenating the first portion of the route with the second portion of the route to generate a route. Generating the first portion of the route or the second portion of the route may optionally include removing a trace point that is less than a proximity tolerance distance away from a trace point immediately preceding the removed trace point in sequence.

11 Claims, 12 Drawing Sheets

METHOD, APPARATUS AND COMPUTER PROGRAM PRODUCT FOR ROUTE GENERATION

TECHNOLOGICAL FIELD

Example embodiments of the present invention relate generally to the generation of a route based on collected location information, and more particularly, to a method, apparatus, and computer program product for collecting trace points, eliminating unnecessary or erroneous trace points, and generating a route along an existing path based on the collected trace points.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Mobile devices, such as cellular telephones, have become smaller and lighter while also becoming more capable of performing tasks that far exceed a traditional voice call. Mobile devices are becoming small, portable computing devices that are capable of running a variety of applications, including navigation applications. Navigation using a mobile device can take many forms, from generating a planned route to a destination to finding nearby points of interest. Further, navigation can establish a route taken and use crowd-sourced information to provide real-time or near real-time information about things such as traffic. While navigation using mobile devices is capable of many functions, further functionality and improved methods of achieving the existing functionality may be desirable.

SUMMARY

In general, an example embodiment of the present invention provides a method, apparatus, and computer program product for the generation of a route from a series of trace points. In particular, the method of example embodiments includes receiving a plurality of trace points, where each of the plurality of trace points includes location information, receiving a distance tolerance value for each trace point, generating a first portion of a route using a first subset of the plurality of trace points, generating a second portion of the route using a second subset of the plurality of trace points, and concatenating the first portion of the route with the second portion of the route to generate a route. Generating the first portion of the route or the second portion of the route may optionally include removing a trace point that is less than a proximity tolerance distance away from a trace point immediately preceding the removed trace point in sequence. Generating the first portion of the route or the second portion of the route may optionally include removing a second trace point that is at least a predefined distance away from a first trace point immediately preceding the removed trace point in sequence, wherein the amount of time between the first trace point and the second trace point is shorter than a predetermined amount of time.

According to some embodiments, generating the first portion of the route or the second portion of the route includes removing one or more trace points in response to the one or more trace points resulting in a discontinuity in the route. Concatenating the first portion of the route with the second portion of the route may include determining an established path that is within a respective distance tolerance value for each trace point. Concatenating the first portion of the route with the second portion of the route may include removing at least a part of the first portion or the second portion in response to determining that the part of the first portion or the second portion comprises a redundant part of the route. In response to determining that an established path is not within a respective distance tolerance value for one or more trace points, an updated tolerance value may be generated for each of the one or more trace points. Methods may optionally determine an established path that is within a respective updated distance tolerance value for each of the one or more trace points.

Example embodiments of the invention provide an apparatus including at least one processor and at least one memory including computer program code. The at least one memory and the computer program code are configured to, with the at least one processor, cause the apparatus to receive a plurality of trace points, where each of the plurality of trace points includes location information, receive a distance tolerance for each trace point, generate a first portion of a route using a first subset of the plurality of trace points, generate a second portion of the route using a second subset of the plurality of trace points, and concatenate the first portion of the route with the second portion of the route to generate a route. Causing the apparatus to generate a first portion of the route or the second portion of the route may include causing the apparatus to remove a trace point that is less than a proximity tolerance distance away from a trace point immediately preceding the removed trace point in sequence. Causing the apparatus to generate a first portion of the route or a second portion of the route may include causing the apparatus to remove a second trace point that is at least a predefined distance away from a first trace point immediately preceding the removed trace point in sequence, where the amount of time between the first trace point and the second trace point is shorter than a predetermined amount of time.

According to some embodiments, causing the apparatus to generate a first portion of the route or the second portion of the route includes causing the apparatus to remove one or more trace points in response to the one or more trace points resulting in discontinuity in the route. Causing the apparatus to concatenate the first portion of the route with the second portion of the route may include causing the apparatus to determine an established path that is within a respective distance tolerance value of each trace point. Causing the apparatus to concatenate the first portion of the route with the second portion of the route may include causing the apparatus to remove at least a part or the first portion or the second portion in response to determining that the part of the first portion of the second portion comprises a redundant part of the route. In response to the apparatus being caused to determine that an established path is not within a respective distance tolerance value for one or more trace points, the apparatus may be caused to generate an updated distance tolerance value for each of the one or more trace points and cause the apparatus to generate an established path that is within a respective updated distance tolerance value for each of the one or more trace points.

Embodiments of the present invention provide a computer program product including at least one non-transitory, computer-readable storage medium having computer executable program code instructions stored therein. The computer executable program code instructions include program code instructions to receive a plurality of trace points, where each of the plurality of trace points includes location information, program code instructions to receive a distance tolerance value for each trace point, program code instructions to generate a first portion of a route using a first subset of the plurality of trace points, program code instructions to generate a second portion of a route using a second subset of the plurality of trace points, and program code instructions to concatenate the first portion of the route with the second portion of the route to generate a route. The program code instructions to generate a first portion of the route or the program code instructions to generate the second portion of the route may optionally include program code instructions to remove a trace point that is less than a predetermined distance away from a trace point immediately preceding the removed trace point in sequence. The program code instructions to generate a first portion of the route or the program code instructions to generate the second portion of the route may optionally include program code instructions to remove a second trace point that is at least a predefined distance away from a first trace point immediately preceding the removed trace point in sequence, wherein the amount of time between the first trace point and the second trace point is shorter than a predetermined amount of time.

According to some embodiments, the computer program product includes program code instructions to generate a first portion of the route or the program code instructions to generate the second portion of the route that further include program code instructions to remove one or more trace points in response to the one or more trace points resulting in discontinuity in the route. The program code instructions to concatenate the first portion of the route with the second portion of the route may include program code instructions to determine an established path that is within a respective distance tolerance value for each trace point. The program code instructions to concatenate the first portion of the route with the second portion of the route may include program code instructions to remove at least a part of the first portion or the second portion in response to determining that the part of the first portion or the second portion comprises a redundant part of the route.

According to some embodiments, an apparatus may be provided including means for receiving a plurality of trace points, where each of the plurality of trace points includes location information, means for receiving a distance tolerance value for each trace point, means for generating a first portion of a route using a first subset of the plurality of trace points, means for generating a second portion of the route using a second subset of the plurality of trace points, and means for concatenating the first portion of the route with the second portion of the route to generate a route. The means for generating the first portion of the route or the second portion of the route may optionally include means for removing a trace point that is less than a proximity tolerance distance away from a trace point immediately preceding the removed trace point in sequence. The means for generating the first portion of the route or the second portion of the route may optionally include means for removing a second trace point that is at least a predefined distance away from a first trace point immediately preceding the removed trace point in sequence, wherein the amount of time between the first trace point and the second trace point is shorter than a predetermined amount of time.

According to some embodiments, the means for generating the first portion of the route or the second portion of the route includes means for removing one or more trace points in response to the one or more trace points resulting in a discontinuity in the route. The means for concatenating the first portion of the route with the second portion of the route may include means for determining an established path that is within a respective distance tolerance value for each trace point. The means for concatenating the first portion of the route with the second portion of the route may include means for removing at least a part of the first portion or the second portion in response to determining that the part of the first portion or the second portion comprises a redundant part of the route. In response to determining that an established path is not within a respective distance tolerance value for one or more trace points, an updated tolerance value may be generated for each of the one or more trace points. Methods may optionally include means for determining an established path that is within a respective updated distance tolerance value for each of the one or more trace points.

DRAWINGS

Having thus described embodiments of the invention in general terms, reference will now be made to the accompanying drawings, which are not necessarily drawn to scale, and wherein:

DETAILED DESCRIPTION

Figure 1:
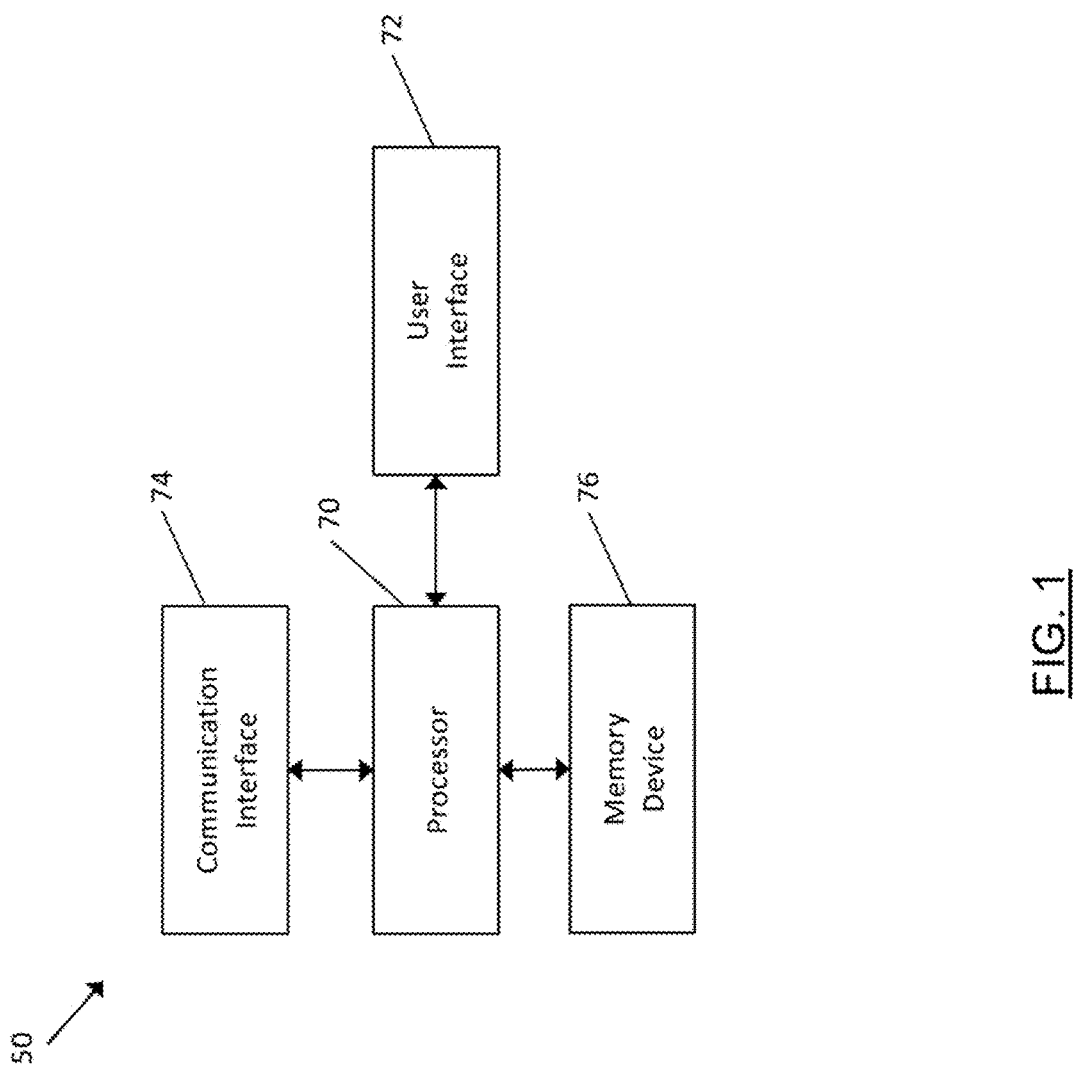
FIG. 1 is a schematic block diagram of an apparatus which may generate a route with a route matching algorithm according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Devices that may benefit from example embodiments of the present invention may include portable computing devices, such as tablet computers, cellular telephones, portable media devices, in-vehicle navigation and/or media systems, or the like, which are enhanced by navigation functionality. These devices may be used for navigation, such as establishing and guiding a user along a route as they walk, drive, cycle, etc., or for generating a route based on information gathered during the movement of a device. Further, fixed computing devices, such as personal computers, servers, or the like, may be configured to implement example embodiments of the present invention by receiving location information and providing the processing resources to establish or generate the routes as described herein. Example embodiments of the present invention may use a routing algorithm to explore many and, in some instances, all possible paths and find the shortest path or route through a sequence of trace points.

FIG. 1 illustrates a block diagram of an apparatus 50 that may benefit from embodiments of the present invention. It should be understood, however, that the apparatus 50 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of communications systems, may readily employ embodiments of the present invention, other devices including fixed (non-mobile) electronic devices, such as an in-dash vehicle navigation system or in-vehicle media system, and a server or server systems, may also employ some example embodiments. The apparatus 50 and its components may be embodied as a single device or by multiple devices in communication with one another, such as with a server providing processing resources and storage with a mobile device providing the user interface.

An example embodiment of the present invention will now be described with reference to FIG. 1, in which certain elements of an apparatus 50 for providing a mechanism by which relevant content may be determined and/or presented are illustrated. The apparatus 50 may, in some embodiments, be a mobile terminal or a computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms. The communication interface 74 may further include means for establishing a location or position. Such means may include a global positioning system (GPS) receiver configured to receive signals from geosynchronous GPS satellites to determine location, and/or means may include a receiver capable of determining location based on terrestrial antennas, beacons, wireless access points, or the like.

A user interface 72 may be in communication with the processor 70, and/or the communication interface 74, to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, device surfaces and/or sensors capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

As outlined herein, example embodiments may include a method, apparatus, and computer program product to generate a route along an established path, such as a roadway, footpath, trail, marine course, Victor airway, highway in the sky, or any other pre-defined course. As such, embodiments may be implemented for use in land travel, air travel, and marine travel. The routes generated through example embodiments described herein may be used for navigation purposes, retracing a route taken, determining travel statistics (minimum/maximum/average speed, total time, distance, etc.), or any other conventional use for established routes. Embodiments provided herein may generate more reliable, accurate routes and may eliminate ancillary deviations from a route.

According to example embodiments, a routing algorithm may be used by the processor 70 to explore many or all possible paths and to find the shortest one through a sequence of trace points. A location determining technique, such as a Global Positioning System (GPS), signal fingerprinting, or signal triangulation, may be used by the processor to obtain trace points, such as way points or probe data, along a route taken by a device, such as a mobile device carried by a user. One or more of the location determining techniques may be used during a single route as the location information may be combined to generate a more reliable, accurate route. For example, in an area where GPS signals may be weak, such as in a tunnel or in a dense urban environment, alternative location determining techniques may supplement GPS information to provide a more accurate location that can be used in establishing a route. Embodiments described herein may include the technical advantage of reducing the processing resources necessary to establish a route by concatenating portions of a route rather than processing each individual trace point received. Further embodiments may reduce processing resources necessary by pre-processing of trace point information to remove trace points that are deemed to not be beneficial to the overall route.

A plurality of trace points may be generated by the processor 70 by the identification of the location of a mobile device as it advances along a route. These trace points may be generated at the mobile device, such as by the processor that obtains location information via communications interface 74 and stores the location within the device, such as in memory device 76. Alternatively or additionally, the location of the device may be reported by the communications interface 74 to a network entity, such as a server, that is configured to store the trace points of the device as it advances along a route. The trace points may include location information, time information, speed, direction, a vehicle or device ID, and/or location information accuracy value. The time information may be a timestamp that is generated relative to a time standard, such as Greenwich Mean Time, or the time stamp may be a time-based metric that is established on the mobile device or a network that the mobile device is in communication with, such as an elapsed time since the device began advancing along the route.

Trace points may be collected periodically, for example, after an elapsed time. This periodic collection may be a fixed amount of time between trace point collections, or the amount of time between trace point collection may be dynamic. For example, if it is determined, for example by processor 70, that the device is advancing along a route at a very slow speed or pace, the amount of time between trace point collection may be extended. Conversely, if it is determined that the device is advancing along a route at a very rapid pace, with a relatively large distance between trace point positions, the amount of time between trace point collections may be reduced.

Each trace point may include a location and a time factor, as described above, and may also include a distance tolerance value. The distance tolerance value may represent the accuracy of the location information, i.e. a location accuracy tolerance value. The distance tolerance value may define a radius such that a trace point's actual location is presumed, within a level of confidence, to be within the circle generated by the radius from the identified trace point location. While in some embodiments a distance tolerance may be a fixed value, the distance tolerance may also be dynamic. For example, in an embodiment in which a GPS signal strength is weak, the accuracy of the GPS may be relatively worse than when there is a strong GPS signal. As such, when a trace point location is determined with a weak GPS signal, the signal strength value may be a factor in increasing the distance tolerance value for that particular trace point. Conversely, if a trace point location is determined with a strong GPS signal, or with an accurate signal fingerprint, the distance tolerance value for that trace point may be reduced as the location is better defined. In any embodiment, the distance tolerance is used to represent an area within which the device is likely to be found. If a trace point has a GPS-sourced location of 40.7577 degrees North latitude and 73.9857 degrees West longitude, and the tolerance is 40 feet, the device is presumed to be within 40 feet of 40.7577° N, 73.9857° W.

Optionally, the distance tolerance value may be generated by the route generation algorithm or an operator of the route generation algorithm such that the route generation algorithm may be run with a confidence value that is related to the distance tolerance value. In this manner, the distance tolerance value that is generated by or for the route generation algorithm may not require the location accuracy tolerance value, but instead uses the distance tolerance value of the algorithm to establish the route independent of an accuracy level of the trace points. In this manner, the operator can adjust the distance tolerance value in order to fine-tune a route generated by the route generation algorithm. For example, the distance tolerance value for an area of dense roadways may be selected to be lower since a higher distance tolerance value is more likely to result in an improper route being determined. The distance tolerance value may be a fixed value during processing the route generation algorithm, or it may change if the operator has set more than one distance tolerance values. Also the route generation algorithm itself may adjust the distance tolerance value for one or more of the specific subset of the trace points, if the confidence value of the algorithm for one or more of the specific subset of trace points is lower or too high than a set value.

When generating a route or a portion of a route, a plurality of trace points may be used by the processor 70 to determine the path taken. However, excess trace points can cause "noise" in the route and can cause inaccuracies if all trace points are used to establish the route. Thus, it may be desirable for the processor to remove trace points that are determined to be erroneous, noisy, or those that cause issues with the generation of a route.

One example embodiment of the removal of trace point may include where a first trace point is received including a first time and a first location. A second trace point is subsequently received with a second time and a second location. If the second location is within a proximity tolerance distance of the first trace point, the second trace point may be discarded. This may reduce trace points that are collected while a device is not moving, or is moving very slowly. Removal of the trace point within the proximity tolerance distance of another trace point may serve to reduce the total number of trace points and the amount of data that is used to generate the route. This proximity tolerance distance may be defined by the algorithm or by a user of the algorithm. In this manner, a proximity tolerance distance could be "fine-tuned" to improve the accuracy of routes generated with the algorithm. Alternatively, the proximity tolerance distance may be defined in the same way, and/or be the same, as the distance tolerance value. Thus, trace point removal may, in some circumstances, be performed, such as by the processor 70, before generation of a complete route. However, trace point removal may also be performed while generating a complete route in order to "clean up" a route, as will be described in more detail below. Thus, trace point removal can be performed by the processor in pre-processing of a route, where the trace point is removed due to its relationship with adjacent trace points (e.g., received either before or after the trace point that is removed), or trace point removal can be performed by the processor in post-processing of a route, where a trace point is discarded due to its relationship or continuity with the overall route, as further described below.

Figure 2:
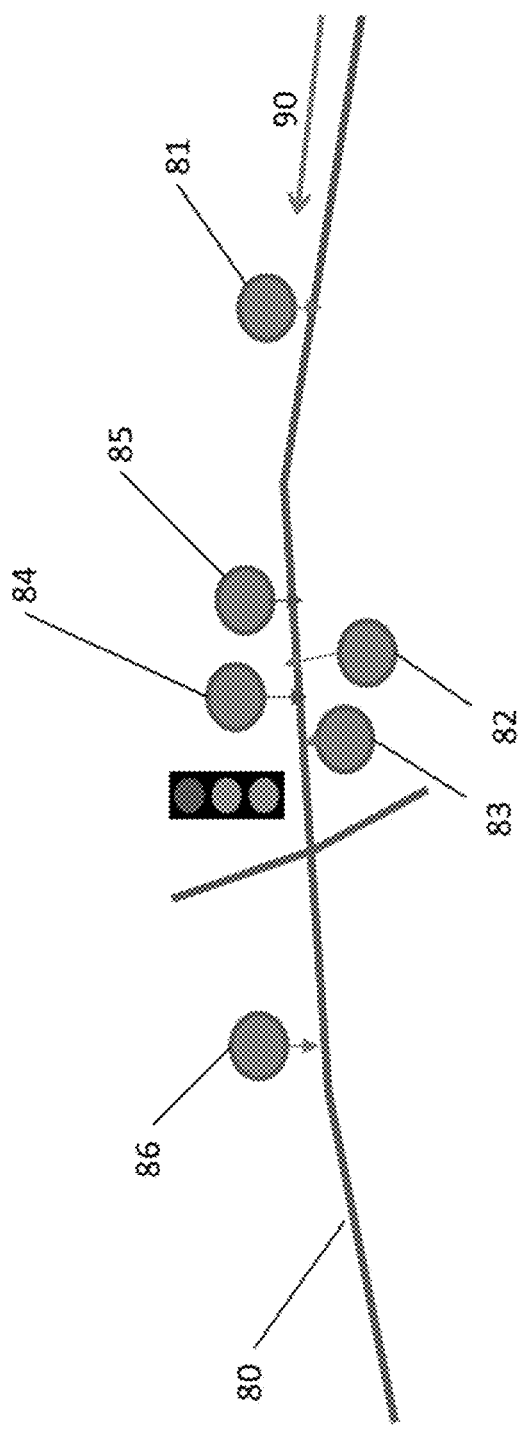
FIG. 2 is an illustration of a series of trace points received from a device advancing along a route according to an example embodiment of the present invention.

FIG. 2 illustrates an example embodiment of an instance in which a device is traveling along an established route 80 in the direction of arrow 90, possibly in or embedded to a vehicle. A first trace point 81 may be collected along the route. The vehicle and device arrive at a traffic light with a stop signal and are stopped at the intersection. The second trace point 82 may be collected. While stopped, three more trace points, 83, 84, and 85, may be collected. Because of the possible inaccuracies of location determination with GPS or with other location determining techniques, trace points 84 and 85 may be along the route 80, but behind the earlier collected trace point 83, in a direction opposite that of travel of the device. As trace points 83, 84, and 85, may be within the proximity tolerance distance of trace point 82, they may be discarded. Once the device is moving again along the route 80, another trace point 86 may be collected. In the illustrated embodiment, three trace points, 81, 82, and 86, may define the illustrated portion of the route. This technique for trace point removal may be performed in pre-processing of a route to help minimize the number of trace points that require removal in post-processing.

Another example embodiment for discarding trace points may include an example in which a first trace point is received with a first location and a first time. A second trace point is subsequently received with a second location and a second time. If the second trace point is a relatively long distance away from the first trace point location, and the time between the capture of the first trace point and the second trace point is relatively short, a determination may be made by the processor 70 that it is not possible for the second trace point to be accurate. For example, if a second trace point is exceptionally far away from the position of the first trace point and the relative speed of the device, as determined through prior trace points is relatively low, then the second trace point may be discarded while awaiting a subsequent trace point. This technique for trace point removal may also be performed in pre-processing of the route; however, similar techniques can be implemented in post-processing as required.

A third example embodiment for discarding a trace point may include where a first trace point is received with a first location, a second trace point is received with a second location, and a third trace point is received with a third location. If the first and third trace points are along an established path, such as along a roadway, trail, or the like, and the second trace point results in a discontinuity from the established path, then the second trace point may be discarded. Generally, this trace point removal may be performed by the processor 70 during post-processing of a route during the establishment of a complete route. A discontinuity from the established path may include where a first subset of trace points ends fails to match up with or align with a second subset of trace points (e.g., when the first subset of trace points ends on a different route), and in such an instance, the discontinuity from the established path may be resolved by removing a trace point that defines the discontinuity.

The collected trace points may be accumulated to establish a complete route. This accumulation may be done on the device, such as storing the trace points in memory device 76, and calculating the route with processor 70, or the trace point accumulation may be on a remote device that is in communication with the device. However, it may be undesirable, or in some cases, impossible to send the large number of trace points accumulated from a route to a remote device. Further, the route establishment may be a continuous process, whereby trace points are sent in batches to be assembled into a route. In such an embodiment, a first portion of a route may be generated by the processor from a first set of trace points. This first set of trace points may be a subset of an entire route of trace points, but the entire route may be created from a plurality of subsets of the trace points from the entire route.

Figure 3:
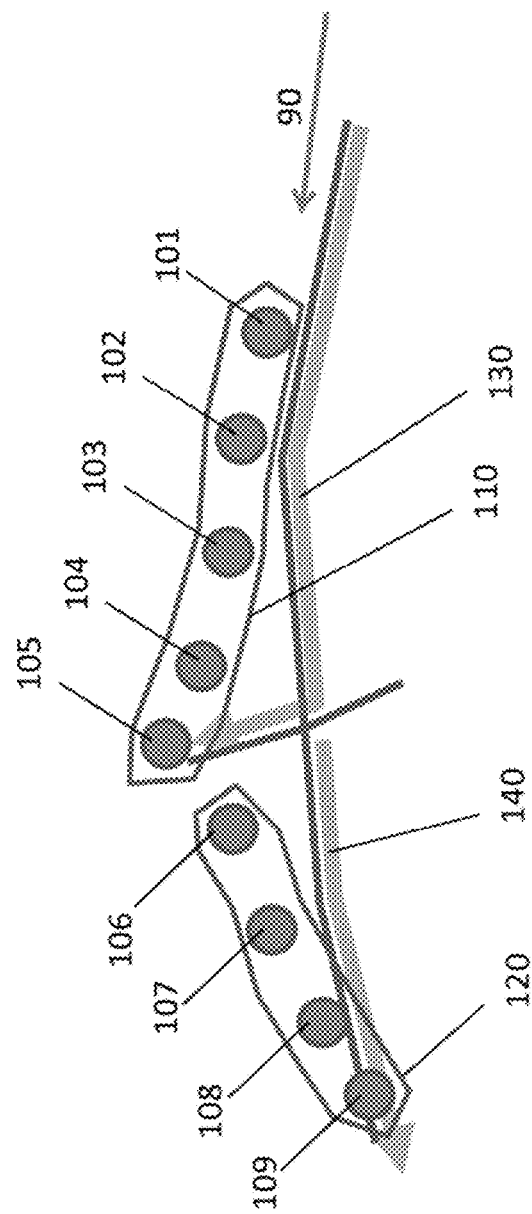
FIG. 3 is an illustration of a series of trace points broken into two subsets of the plurality of trace points for establishing a route according to an example embodiment of the present invention.
Figure 4:
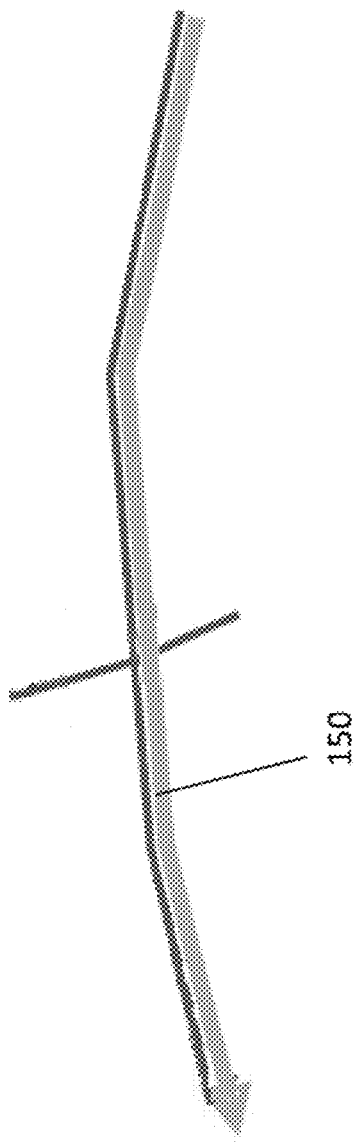
FIG. 4 illustrates the route generated from the plurality of trace points of FIG. 3 according to an example embodiment of the present invention.

A first subset of trace points may be accumulated to form the first portion of the route. This first portion may be sent to the device that is establishing the entire route, whether it is performed locally by the processor 70 on the device traveling along the route, or remotely on another device. FIG. 3 illustrates an example embodiment in which the trace points have been broken into subsets, where a first subset 110 of the trace points (101-105) collected by a device traveling in the direction of arrow 90 are used to establish a first portion of a route 130. A second subset 120 of trace points (106-109) are collected by a device traveling along the route, and a second portion of the route 140 is established by the processor. As illustrated, the routes are discontinuous, since the first portion of the route is estimated to make a right turn at the intersection, while the second portion of the route illustrates that the route continued straight across the intersection. The first portion of the route and the second portion of the route may be concatenated by the processor to form a complete route, as illustrated in FIG. 4 as 150.

As illustrated and described, the concatenation of subsets of trace points can be used to eliminate trace points that were identified as potential dead ends that depart from the overall route. The concatenation can "clean up" the route and eliminate or reduce the potential erroneous trace points by ridding the route of single points that deviate from a known route, or a plurality of points that represent a U-turn that does not benefit the overall route. If a U-turn is perceived on the route by duplicative trace points, the degree to which the U-turn extends from the route may be used to determine whether to include the U-turn portion in the route. For example, the U-turn may involve a necessary part of the route, such as what is known as a "Michigan Left" in which a left turn is replaced by a U-turn followed by a right-turn.

In general, the concatenation of portions of the route serves to stitch-together portions of the route to form a complete route. Where portions of the route may not match-up well with adjacent portions of the route, the concatenation may repair the portions of the route by causing them to align with one another to become a continuous route. This repair may include the removal of trace points that induce route discontinuities and trace points that do not benefit the overall route.

Figure 6:
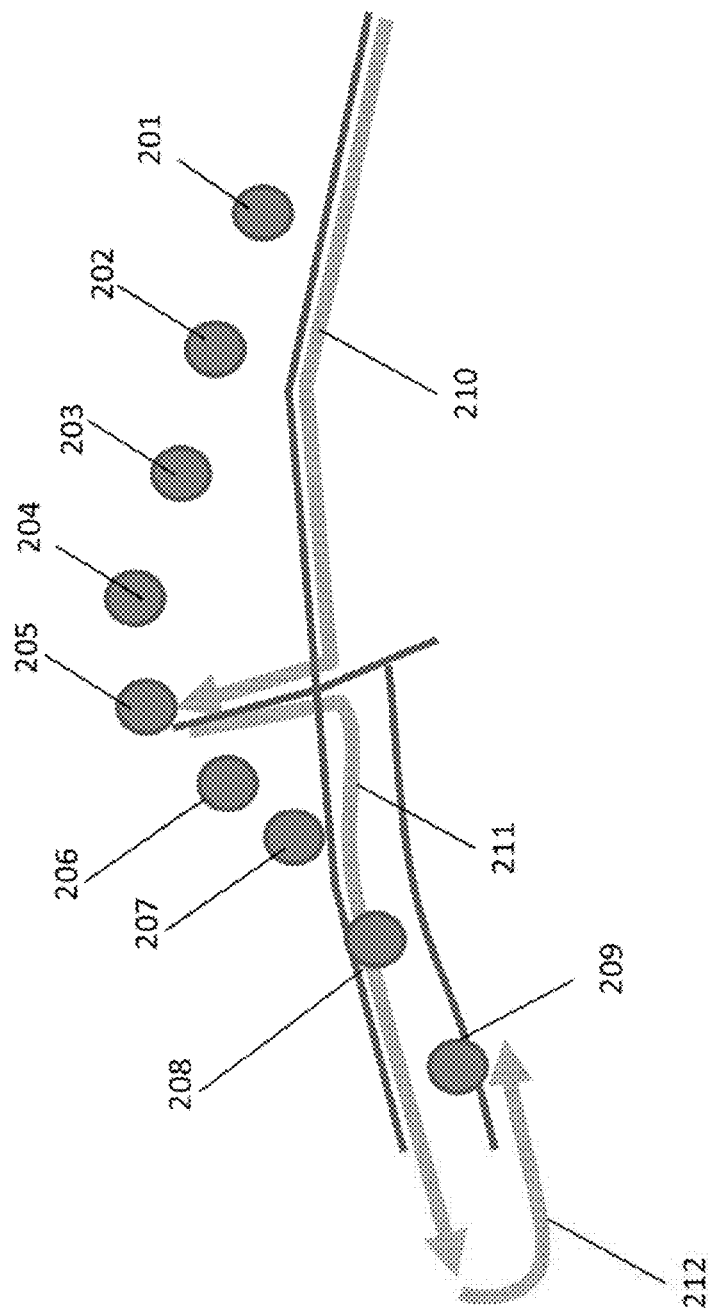
FIG. 6 illustrates potential routes that could be established from the trace points of FIG. 5.

FIG. 6 illustrates another example embodiment of a plurality of trace points being received along a route. The trace points may be received beginning with point 201 ending with point 209. The degree of accuracy of the trace point locations may pose an issue when there are multiple established routes or paths that are in relatively close proximity to one another. Conventional route mapping algorithms may interpret the read trace points 201-209 as the three routes identified in FIG. 6, including the first route portion 210, second route portion 211, and third route portion 212. This series of routes, while appearing inaccurate to one of ordinary skill in the art, may not be interpreted by a conventional algorithm as improper. Thus, including a distance tolerance with the trace points may benefit the route mapping algorithm to appropriately generate the route from the trace points.

Figure 5:
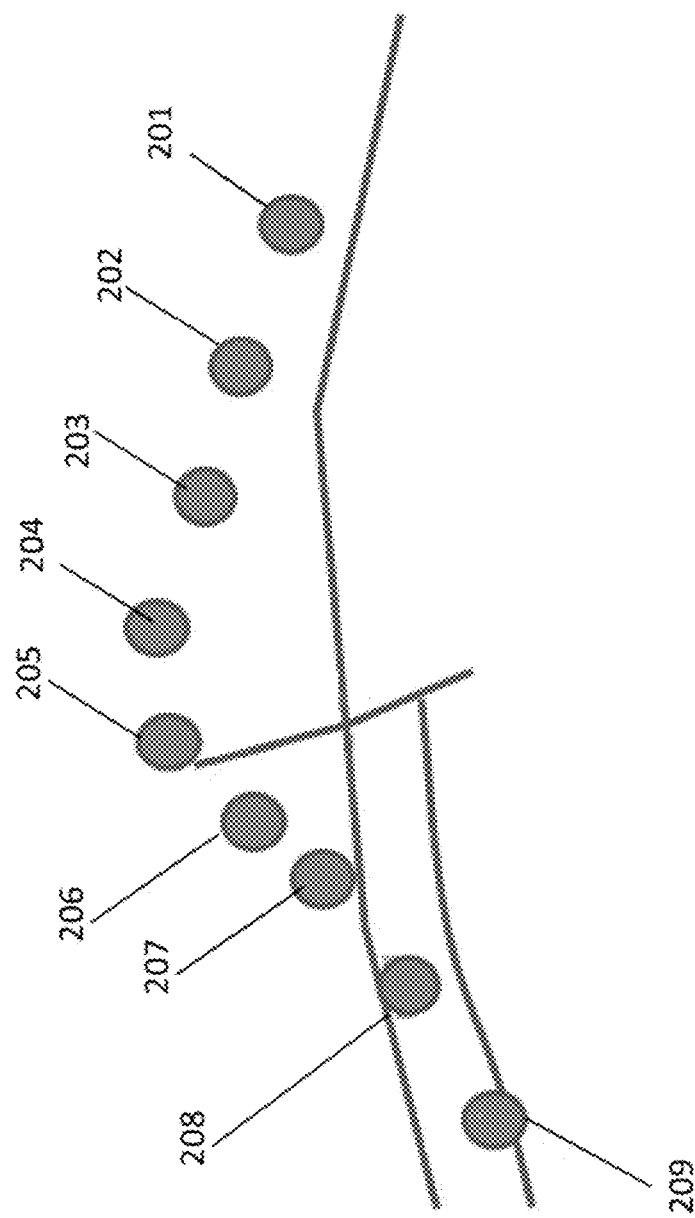
FIG. 5 is an illustration of another series of trace points received from a device advancing along a route according to an example embodiment of the present invention.
Figure 7:
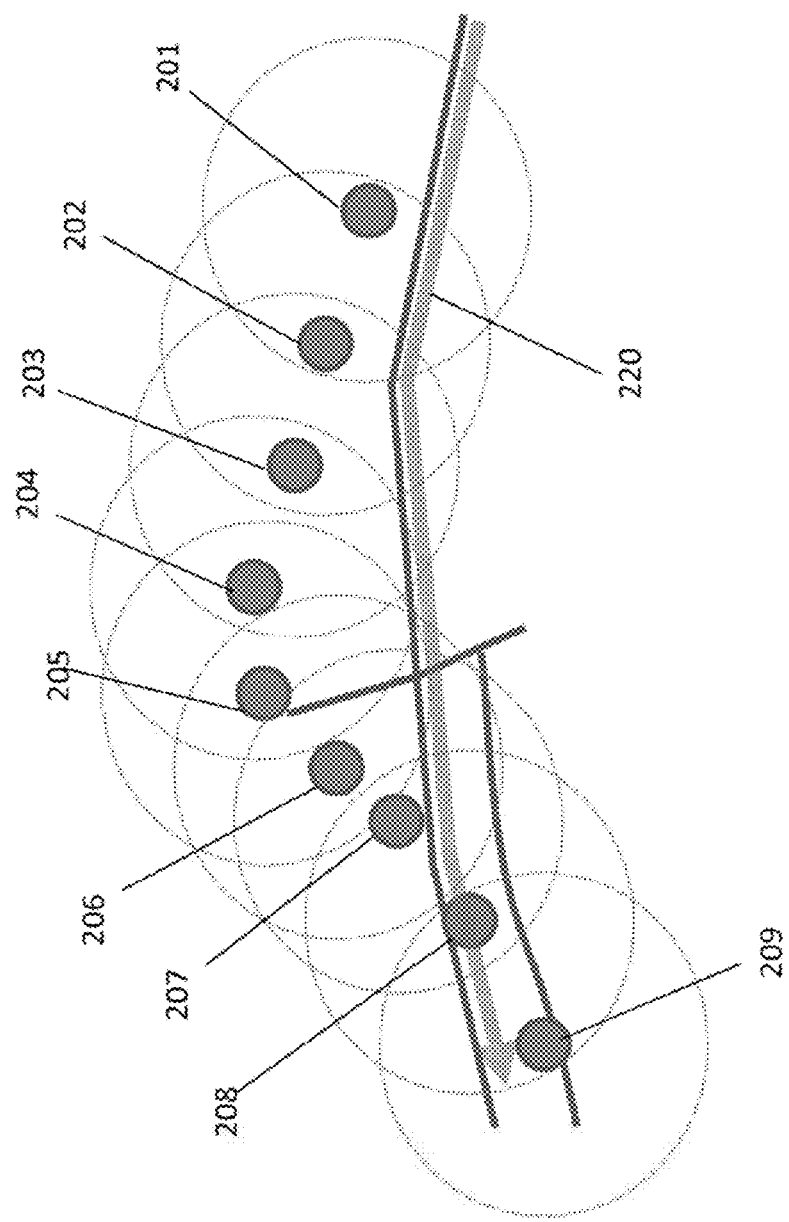
FIG. 7 illustrates the trace points of FIG. 5 together with representations of the tolerance distances of the trace points and the route generated according to an example embodiment of the present invention.

FIG. 7 illustrates the trace points 201-209 of FIG. 5 with distance tolerance values representing a radius depicted by the circles surrounding each trace point. As shown, while the trace points do not fall exactly on the actual route traveled 220, as the actual route traveled 220 is within the distance tolerance of points 201-203 and 205-209, and since trace point 204 can be discarded through the means described above, the route matching algorithm of example embodiments can still determine the proper route traveled 220 from the data, thus eliminating the incorrect and erroneous route portions 210-211 of FIG. 6. As described above, this distance tolerance value may be a location accuracy-based distance tolerance value, or the distance tolerance value may be specific to the route generation algorithm.

Figure 8:
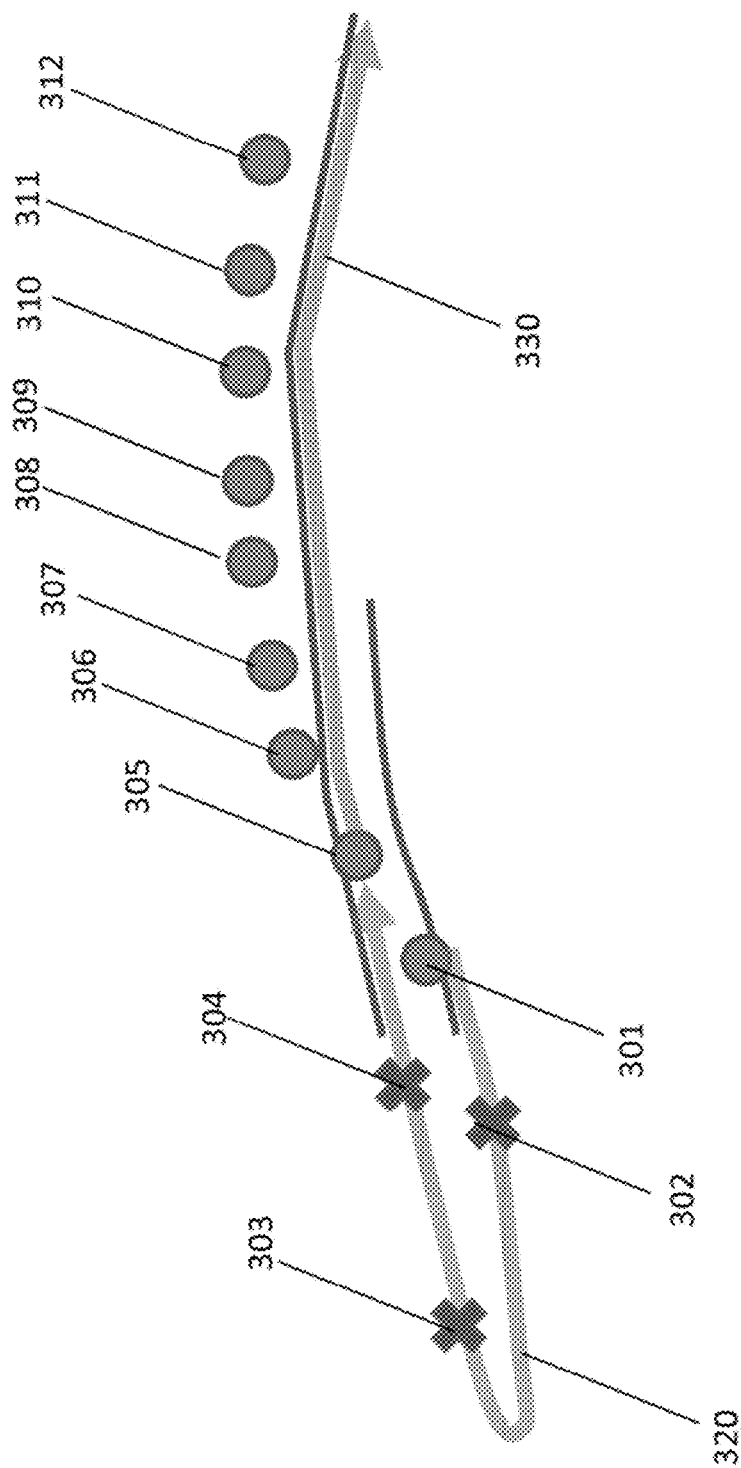
FIG. 8 illustrates a series of trace points with trace points unnecessary to the complete route eliminated according to an example embodiment of the present invention.

Example embodiments of the route matching algorithm utilized by the processor 70 described herein may also be configured to eliminate portions of a route determined to be unnecessary or not required to be a part of a route from a start point to an end point. FIG. 8 illustrates such an example in which a journey begins with the device advancing in a direction opposite to the direction of the destination. The first trace point 301 is received, followed by trace points 302, 303, and 304. Trace points 305-312 are subsequently received. The route matching algorithm may determine that trace points 302, 303, and 304, are unnecessary, where a device may have been in a car that was parked on a street facing the opposite direction of their destination. Thus, the elimination of points 302, 303, and 304, may lead to a better, more accurate route of trace point 301 followed by trace points 305-312, using route 330 and eliminating route 320.

Figure 9:
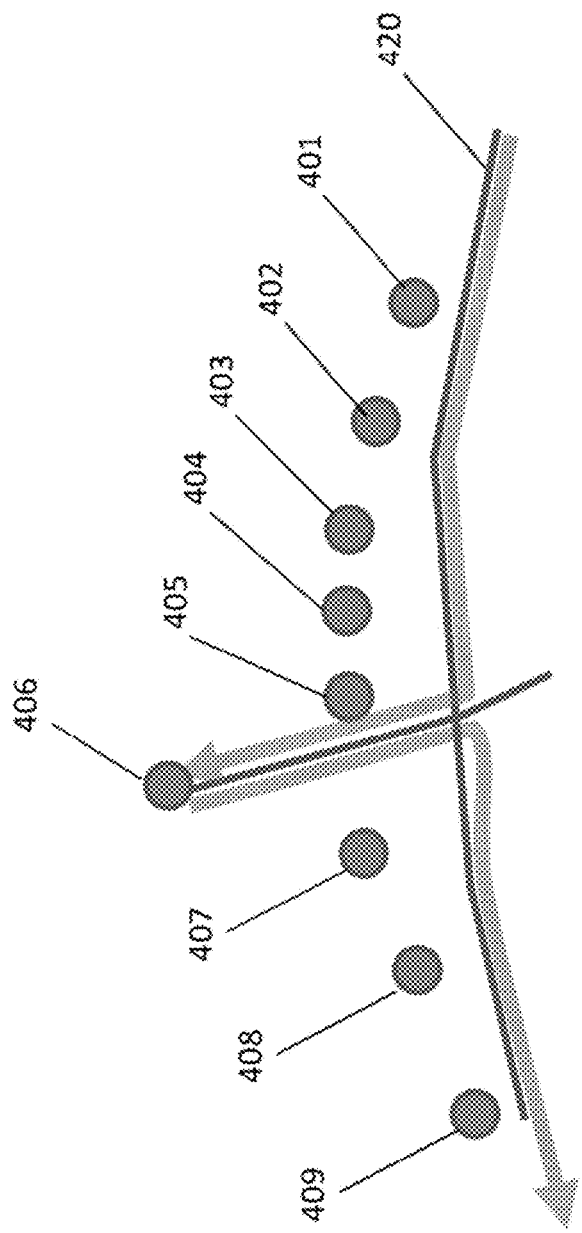
FIG. 9 is an illustration of a series of trace points received from a device traveling along a route and the potential routes that can be established from the trace points according to an example embodiment of the present invention.

As described above, groups of trace points may be received as chunks of the entire route as subsets of the trace points that define the entire route. The concatenation of these subsets or chunks may better establish a complete route. In some cases, the concatenation of these subsets of trace points may identify a loop or a redundant portion of the route that was traveled multiple times, or a loop that was traveled only once, but the loop did not bring the device closer to its destination. In such an embodiment, the loop may be eliminated. FIG. 9 illustrates an example embodiment of a loop which may be eliminated. As illustrated in FIG. 9, trace points 401-405 were received within a tolerance distance of the route 420. Point 406 was received more than a tolerance distance away from route 420, but along another established path. Subsequently, trace points 407-409 were received within a tolerance distance of route 420. While trace point 406 was not received erroneously, concatenation during the route matching algorithm implemented by the processor 70 may determine that trace point 406 represents a deviation or improperly taken portion of the route since it brought the device no closer to the actual route. Thus, trace point 406 and the U-turn related thereto may be eliminated. Redundant portions of a route may be eliminated when a portion of the route appears to have been traveled multiple times without benefiting the overall route, or when two subsets of trace points of the route appear to overlap one another, causing a redundancy in the trace point information. Further, if a route portion is determined, by the processor 70, to not bring the device closer to a more direct route along the trace points to the destination, then the route portion may be eliminated from the route. When a redundancy is encountered in the route, trace points may be eliminated in order to remove the redundancy to benefit the overall route.

Figure 10:
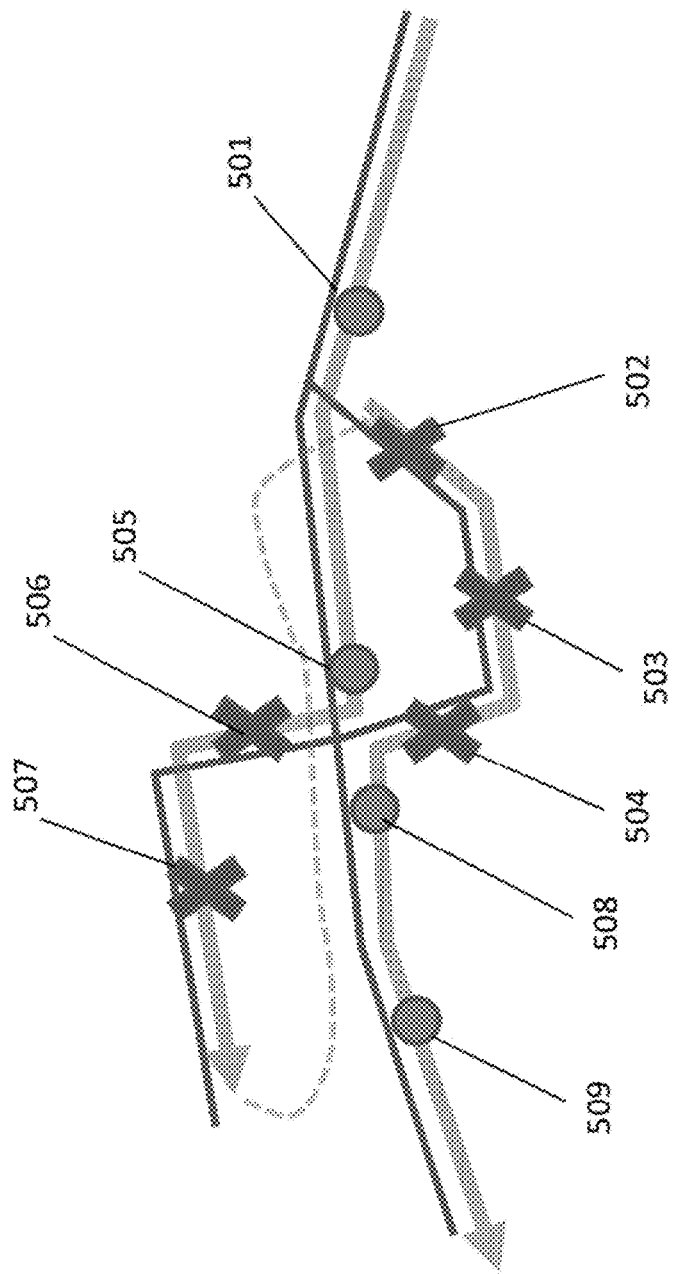
FIG. 10 illustrates another series of trace points received from a device traveling along a route and the potential routes that can be established from the trace points according to an example embodiment of the present invention.
Figure 11:
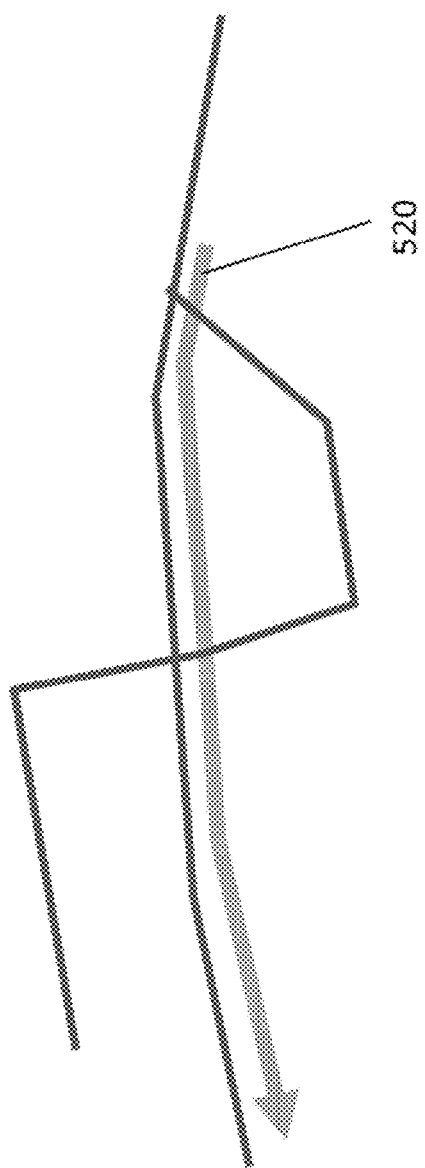
FIG. 11 depicts the route generated from the series of trace points illustrated in FIG. 10 by a route matching algorithm according to an example embodiment of the present invention.

FIG. 10 illustrates another example embodiment of trace points that may be eliminated through concatenation and the route matching algorithm. First trace point may be received at 501, while trace points 502-509 may be received in order of their numbering. The route matching algorithm may acknowledge points 502-504 and 506-507 as valid trace points disposed proximate established paths; however, these trace points may not correlate to another subset of trace points received. Thus, if two trace points, such as points 504 and 505 are received and disposed proximate an established path without causing the complete route to include dead ends or disconnected route chunks, the route matching algorithm may eliminate trace points 502-504 and 506-507, establishing the route 520 as shown in FIG. 11.

Embodiments of the route generation algorithm described herein may be used in various practical applications. For example, a device may be used to track the behaviors and performance of a driver of a vehicle. In such an embodiment, a request could be received by a user, an insurance company, a fleet manager, etc., for route information relating to driver speed, driver rating, route irregularities, etc. This information may be gathered from the route generation algorithm by identifying the removed trace points and their reasons for removal, identifying speed averages between trace points, along a route, or along a portion of a route, or identifying a particular route taken between a starting point and a destination. This information may be used by the requestor to establish a rating for the driver, such as an efficiency rating (e.g., through route adherence), a safety rating (e.g., based on vehicle speed), or an overall driver score that factors in various parameters that can be determined through the route generation algorithm.

According to some embodiments, a user may request recording and analysis of a specific vehicle before a journey has started or during the journey. The system operating the route generation algorithm, whether locally on a device traveling in the vehicle, or remote operating in communication with the device in the vehicle, may analyze the trace points (e.g., gathering, assembling into portions of a route, discarding trace points, concatenating the portions of the route, etc.) and send the results for further analysis, either on the same device, or on a device in communication with the system operating the route generation algorithm. For example, the route generated and the information related thereto may be sent to a device for further analysis of speed, efficiency, driver rating, etc., and optionally the route generated and information related thereto may be provided for display to a user for review or analysis.

Figure 12:
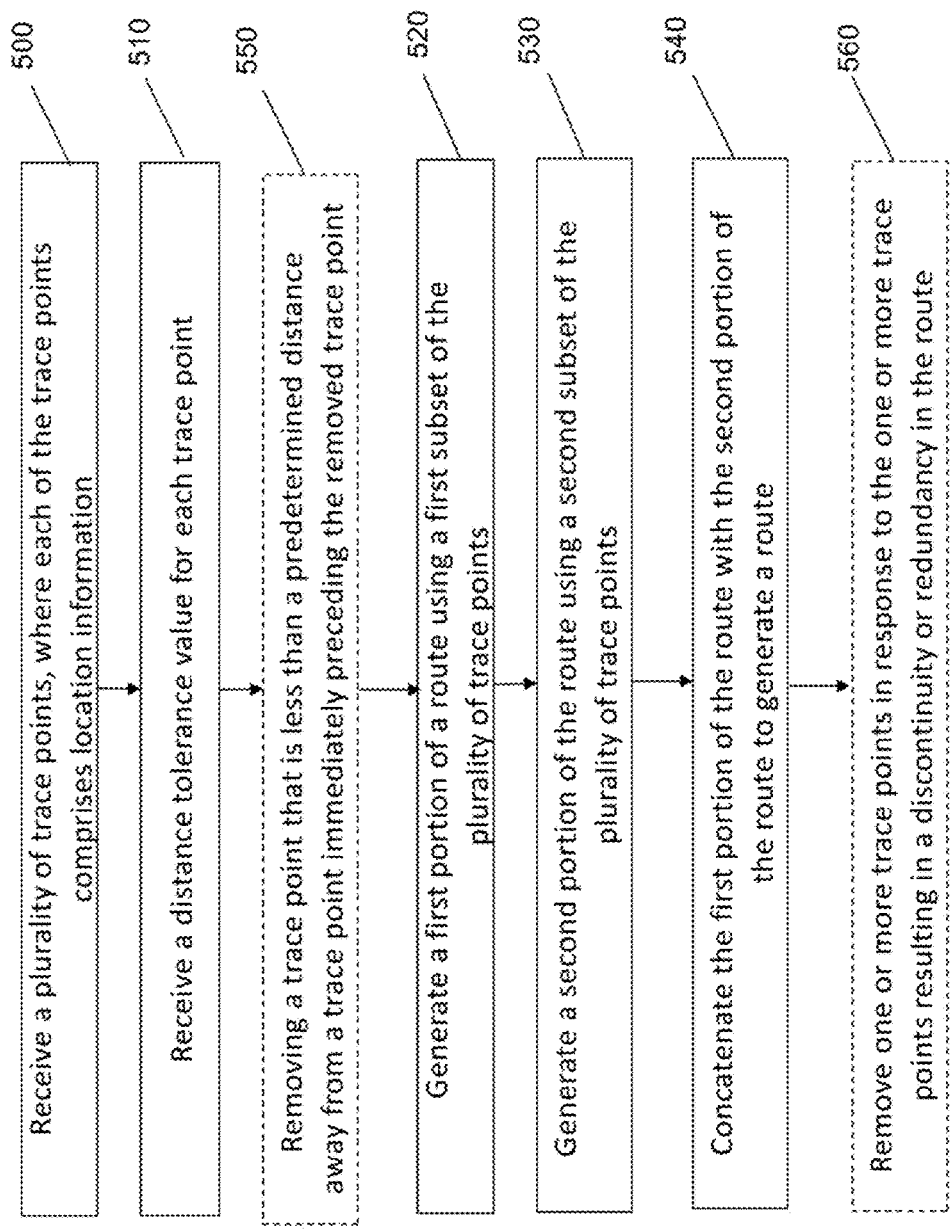
FIG. 12 is a flowchart of a method for generating a route by a route matching algorithm according to an example embodiment of the present invention.

FIG. 12 is a flowchart of a method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user device and executed by a processor in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 12, may include receiving a plurality of trace points, where each of the trace points includes location information, as shown at 500. A distance tolerance value for each trace point may be received at 510. The distance tolerance value may be the same for all trace points received, or it may be dynamically altered according to various parameters associated with the movement of a device. A first portion of a route may be generated with a first subset of the plurality of trace points at 520. A second portion of the route may be generated with a second subset of the plurality of trace points at 530. The first portion of the route and the second portion of the route may be concatenated to generate a complete route at 540.

In some embodiments, certain ones of the operations above may be modified or further amplified as described below. Moreover, in some embodiments additional optional operations may also be included, as indicated by the dashed lines in FIG. 12. It should be appreciated that each of the modifications, optional additions or amplifications below may be included with the operations above either alone or in combination with any others among the features described herein. With reference to the method of FIG. 12, some example embodiments may include removing a trace point that is less than a predetermined distance away from a trace point immediately preceding the removed trace point as shown at 550. Embodiments may optionally remove one or more trace points in response to the one or more trace points resulting in a discontinuity or redundancy in the route as shown at 560.

In an example embodiment, an apparatus for performing the method of FIG. 12 above may comprise a processor (e.g., the processor 70) configured to perform some or each of the operations (500-560) described above. The processor 70 may, for example, be configured to perform the operations (500-560) by performing hardware implemented logical functions, executing stored instructions, or executing algorithms for performing each of the operations. Alternatively, the apparatus may comprise means, such as the processor, at least one processor and at least one memory including a computer program code, a computer program product, or the like for performing each of the operations described above.

An example of an apparatus according to an example embodiment may include at least one processor and at least one memory including computer program code. The at least one memory and the computer program code may be configured to, with the at least one processor, cause the apparatus to perform the operations 500-560 (with or without the modifications and amplifications described above in any combination).

An example of a computer program product according to an example embodiment may include at least one non-transitory computer-readable storage medium having computer-executable program code portions stored therein. The computer-executable program code portions may include program code instructions for performing operations 500-560 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving a plurality of trace points, wherein each of the plurality of trace points comprises location information generated from a global positioning system of a vehicle having a driver and a timestamp including a time associated with the location information;
    receiving a distance tolerance value for each trace point;
    removing, via a processor, at least one first trace point of the plurality of trace points to form a plurality of remaining trace points in response to the at least one first trace point being less than a predetermined distance away from a second trace point of the plurality of trace points immediately preceding the at least one first trace point in sequence;
    generating by the processor a first portion of a route using a first subset of the plurality of remaining trace points;
    generating a second portion of the route using a second subset of the plurality of remaining trace points;
    wherein generating the first portion of the route or the second portion of the route comprises removing at least one third trace point that is at least a predefined distance away from a fourth trace point immediately preceding the removed third trace point in sequence, wherein an amount of time between the timestamp of the third trace point and the timestamp of the fourth trace point is shorter than a predetermined amount of time;
    concatenating the first portion of the route with the second portion of the route to generate a combined route, wherein concatenating the first portion of the route with the second portion of the route comprises determining an established path that is within a respective distance tolerance value for each trace point;
    storing the combined route associated with the established path in a memory; and
    analyzing driver behavior based on the combined route, wherein analyzing driver behavior comprises establishing an overall driver rating based on the combined route representative of driver safety or efficiency for use in quantifying risk posed by the driver that has traversed the combined route.

2. The method of claim 1, wherein generating the first portion or the second portion of a route comprises removing one or more trace points from the plurality of remaining trace points in response to the one or more trace points resulting in discontinuity in the route.

3. The method of claim 1, wherein concatenating the first portion of the route with the second portion of the route comprises removing at least a part of the first portion or the second portion in response to determining that the part of the first portion or the second portion comprises a redundant part of the route.

4. The method of claim 1, wherein in response to determining that an established path is not within a respective distance tolerance value for one or more trace points, generating an updated distance tolerance value for each of the one or more trace points and determining an established path that is within a respective updated distance tolerance value for each of the one or more trace points.

5. An apparatus comprising at least one processor and at least one memory including computer program code, the at least one memory and the computer program code configured to, with the at least one processor, cause the apparatus to:
    receive a plurality of trace points, wherein each of the plurality of trace points comprises location information generated from a global positioning system of a vehicle having a driver;
    receive a distance tolerance value for each trace point;
    remove at least one first trace point of the plurality of trace points to form a plurality of remaining trace points in response to the at least one first trace point being less than a predetermined distance away from a second trace point of the plurality of trace points immediately preceding the at least one first trace point in sequence;
    generate a first portion of a route using a first subset of the plurality of remaining trace points;
    generate a second portion of the route using a second subset of the plurality of remaining trace points;
    wherein causing the apparatus to generate the first portion of the route or the second portion of the route comprises causing the apparatus to remove at least one third trace point that is at least a predefined distance away from a fourth trace point immediately preceding the removed third trace point in sequence, wherein an amount of time between the timestamp of the third trace point and the timestamp of the fourth trace point is shorter than a predetermined amount of time;

concatenate the first portion of the route with the second portion of the route to generate a combined route, wherein concatenating the first portion of the route with the second portion of the route comprises determining an established path that is within a respective distance tolerance value for each trace point;

store the combined route associated with the established path in a memory; and analyze driver behavior based on the combined route, wherein analyzing driver behavior comprises establishing an overall driver rating based on the combined route representative of driver safety or efficiency for use in quantifying risk posed by the driver.

6. The apparatus of claim 5, wherein causing the apparatus to generate a first portion of the route or the second portion of the route comprises causing the apparatus to remove one or more trace points from the plurality of remaining trace points in response to the one or more trace points resulting in discontinuity in the route.

7. The apparatus of claim 5, wherein causing the apparatus to concatenate the first portion of the route with the second portion of the route comprises causing the apparatus to remove at least a part of the first portion or the second portion in response to determining that the part of the first portion or the second portion comprises a redundant part of the route.

8. The apparatus of claim 5, wherein in response to the apparatus being caused to determine that an established path is not within a respective distance tolerance value for one or more trace points, causing the apparatus to generate an updated distance tolerance value for each of the one or more trace points and causing the apparatus to generate an established path that is within a respective updated distance tolerance value for each of the one or more trace points.

9. A computer program product comprising at least one non-transitory computer-readable storage medium having computer executable program code instructions stored therein, the computer executable program code instructions comprising:

program code instructions to receive a plurality of trace points, wherein each of the plurality of trace points comprises location information generated from a global positioning system of a vehicle having a driver;

program code instructions to receive a distance tolerance value for each trace point;

program code instructions to remove at least one first trace point of the plurality of trace points to form a plurality of remaining trace points in response to the at least one first trace point being less than a predetermined distance away from a second trace point of the plurality of trace points immediately preceding the at least one first trace point in sequence;

program code instructions to generate a first portion of a route using a first subset of the plurality of trace points;

program code instructions to generate a second portion of the route using a second subset of the plurality of trace points;

wherein the program code instructions to generate the first portion of the route or the second portion of the route comprises program code instructions to remove at least one third trace point that is at least a predefined distance away from a fourth trace point immediately preceding the removed third trace point in sequence, wherein an amount of time between the timestamp of the third trace point and the timestamp of the fourth trace point is shorter than a predetermined amount of time;

program code instructions to concatenate the first portion of the route with the second portion of the route to generate a combined route, wherein concatenating the first portion of the route with the second portion of the route comprises determining an established path that is within a respective distance tolerance value for each trace point;

program code instructions to store the combined route associated with the established path in a memory; and program code instructions to analyze driver behavior based on the combined route, wherein analyzing driver behavior comprises establishing an overall driver rating based on the combined route representative of driver safety or efficiency for use in quantifying risk posed by the driver.

10. The computer program product of claim 9, wherein the program code instructions to generate a first portion of the route or the program code instructions to generate the second portion of the route comprise program code instructions to remove one or more trace points from the plurality of remaining trace points in response to the one or more trace points resulting in discontinuity in the route.

11. The computer program product of claim 9, wherein the program code instructions to concatenate the first portion of the route with the second portion of the route comprises program code instructions to remove at least a part of the first portion or the second portion in response to determining that the part of the first portion or the second portion comprises a redundant part of the route.

\* \* \* \* \*